United States Patent [19]

Krude

[11] Patent Number: 4,600,072
[45] Date of Patent: Jul. 15, 1986

[54] INDEPENDENT WHEEL SUSPENSION USING THRUST BEARING CONSTANT VELOCITY UNIVERSAL DRIVE JOINTS AS SUSPENSION MEMBERS IN COMBINATION WITH A WHEEL ASSEMBLY AND DIFFERENTIAL COUPLED TO PIVOT ABOUT A TRANSVERSE STABILIZER

[75] Inventor: Werner Krude, Grosse Pointe Park, Mich.

[73] Assignee: GKN Automotive Components, Inc., Southfield, Mich.

[21] Appl. No.: 586,098

[22] Filed: Mar. 5, 1984

[51] Int. Cl.⁴ .............................................. B60K 20/00
[52] U.S. Cl. ...................................... 180/73.3; 180/75
[58] Field of Search .................... 180/73.1, 73.2, 73.4, 180/73.3, 73.5, 75, 71, 70.1, 88; 280/689, 700, 701, 721, 723

[56] References Cited

U.S. PATENT DOCUMENTS 2,716,461 8/1955 MacPherson ...................... 180/73.3
2,968,357 1/1961 Roller .................................. 280/701

FOREIGN PATENT DOCUMENTS

2447831 4/1976 Fed. Rep. of Germany ...... 280/721
975461 11/1982 U.S.S.R. ............................... 280/689

Primary Examiner—John J. Love
Assistant Examiner—Ross Weaver
Attorney, Agent, or Firm—Remy J. VanOphem

[57] ABSTRACT

An independent wheel suspension system having a pair of spaced-apart wheel assemblies, a stabilizer rod having end portions rotatably supported by respective side frame members of the vehicle frame about a transverse pivot axis, a pair of trailing arms having one end coupled to a respective wheel assembly and another end fixed to the stabilizer rod wherby the stabilizer rod cooperates with the trailing arms to restrain relative motion of one wheel assembly relative to the other about the transverse pivot axis, a non-metallic stabilizer tube resiliently supported by the stabilizer rod intermediate the trailing arms, a differential attached by a mounting plate to the stabilizer tube to allow relative movement between the differential and the frame about the transverse pivot axis, and a prop shaft coupling the differential and the engine with only one universal joint, that joint being of the constant velocity plunging type, whereby the movement of the differential relative to the frame about the transverse pivot axis accommodates articulation between the prop shaft and the engine and whereby the stabilizer tube increases bending stiffness along the transverse pivot axis while also dampening vibrations and noise from the wheel assemblies, differentials, frame and engine.

12 Claims, 6 Drawing Figures

INDEPENDENT WHEEL SUSPENSION USING THRUST BEARING CONSTANT VELOCITY UNIVERSAL DRIVE JOINTS AS SUSPENSION MEMBERS IN COMBINATION WITH A WHEEL ASSEMBLY AND DIFFERENTIAL COUPLED TO PIVOT ABOUT A TRANSVERSE STABILIZER

CROSS-REFERENCE TO RELATED APPLICATIONS

This patent application is related to the following copending applications assigned to the common assignee hereof:

U.S. Ser. No. 586,086, filed Mar. 5, 1984, entitled "Independent Wheel Suspension System Using Thrust Bearing Constant Velocity Universal Drive Joints As Suspension Members";

U.S. Ser. No. 586,012, filed Mar. 5, 1984, entitled "Independent Wheel Suspension System Using Thrust Bearing Constant Velocity Universal Drive Joints, Bending and Torsional Motion Resistance Suspension Members And A Transversely Pivotable Differential";

U.S. Ser. No. 586,056, filed Mar. 5, 1984 entitled "Independent Wheel Suspension System Using Thrust Bearing Constant Velocity Universal Drive Joints As Suspension Members In Combination With A Single Prop Shaft Joint and A Transversely Pivotable Differential";

U.S. Ser. No. 586,011, filed Mar. 5, 1984 entitled "Independent Wheel Suspension System Using Thrust Bearing Constant Velocity Universal Drive Joints As Suspension Members To Minimize Wheel Camber";

U.S. Ser. No. 586,022, filed Mar. 5, 1984 entitled "Independent Wheel Suspension System Using Constant Velocity Universal Joints In Combination With A Single Prop Shaft Joint And Mounted Differentials"; and U.S. Ser. No. 586,054, filed Mar. 5, 1984 entitled "Independent Wheel Suspension System Having A Differential Pivotable About Two Axes".

1. Field of the Invention

The present invention pertains to independent wheel suspension systems and, more particularly, to independent wheel suspension systems employing transverse stabilizers.

2. Description of the Prior Art

The present invention has particular application to both front and rear wheel independent suspension systems wherein universal joints are used to transfer power from a power delivery unit, normally including an engine, transmission and a differential housing, through half-shaft drive axles to the driving wheels. As a vehicle moves along a road surface, the wheels naturally experience an up and down movement relative to the driving surface. This movement is referred to as jounce and rebound, and the road clearance of various vehicle components vary accordingly. If the wheels are allowed to move in a plane approximately normal to the driving surface, such up and down movements have heretofore required corresponding changes in the swing length between the wheel and the differential of the power delivery unit. Such changes in swing length are normally effected by allowing an axial adjustment either of a driving member relative to the wheels or of one member of a driving member relative to another. Because of the dynamic loads associated with these up and down movements of the wheel and the geometric movements of the suspension members as a result of the various load and road conditions experienced by the wheels of a vehicle, past suspension system design efforts have taken the posture of completely isolating the drive system components from the suspension system components to prevent the application of suspension loads to the power delivery unit or torque translating drive components of a vehicle. As a result of this posture the structural design criteria of prior art vehicles is to limit the torque translating components of a vehicle to carry only torque loads to propel the vehicle and to design a separate suspension system to carry the loads associated with the up and down movement of the vehicle wheels as a result of load and/or road variations.

Independent wheel suspension systems generally contemplate the use of two general types of universal driving joints: the Cardan-type joint and the constant velocity type joint. The Cardan-type joint consists of two yokes connect by a plain or rolling type bearing on the ends of a Cardan or cruciform-shaped cross. The cross consists of a block and two pins, one pin being smaller than the other and passing through it. Even though heat-treated alloy steels are used throughout, the small pin diameters limit the capacity of the joint to carry axial thrust loads, such axial thrust loads normally impose stresses on the pins which are multiples of the stresses associated with carrying normal driving torque. Moreover, the stresses augment each other deleteriously, through vector addition. But the major deterrent to using a single Cardan-type joint in an independent rear suspension system is the severe limitation on the allowable angle of articulation under high torque loads. This is because the velocity ratio of the speed of the driving to the driven shaft pulsates or "knuckles" with increasing amplitudes as the angular articulation between these shafts increases. The cyclic speed pulsations significantly increase as articulation between the driving and driven joint members increase. Such speed pulsations cause correspondingly higher dynamic stresses on the Cardan cross pins and corresponding vehicle vibration and noise as loads of any appreciable inertia are translated through the joint. The higher dynamic stresses wear the joint structure to degeneratively further increase the speed variations and further limit the ability of the Cardan joint to carry high torque loads. Moreover, under thrust loads, the normal manufacturing tolerance of a Hooke's joint or Cardan joint, by themselves, cause unacceptable vibrations.

To avoid the foregoing deleterious stress and load carrying consequences of Cardan-type universal joints, their use in vehicles is generally limited to applications where the normal angular articulation between the driving and driven members is substantially less than ten degrees, usually less than three degrees. Even then, as herein above set forth, other structure is provided to divert the axial thrust loads away from the Cardan-type universal joints. For example, British Pat. No. 765,659 discloses the use of a Cardan-type universal joint to carry just the driving torque. A spherical socket and a mating ball-shaped member are provided about the Cardan joint to divert the axial thrust loads away therefrom. The patent to Etnyre, U.S. Pat. No. 3,112,809, discloses the use of Cardan-type universal joints to couple the inboard and outboard ends of a live axle. Lateral forces on the wheel are disclosed as being resisted by the live axle and also by a cantilever leaf spring. The Cardan universal joints are disclosed as being capable of absorbing axial loads well in excess of those encountered under normal conditions, but such conditions are limited to use of the joints only as a drive member and not as a suspension member.

Being limited in their allowable articulation and not being able to carry axial thrust loads normally associated with an operating vehicle, Cardan-type universal joints are not used as a suspension member, thereby requiring other pivot points displaced outboard from such Cardan joint and additional suspension control members connected to such other pivot points to carry the axial thrust loads.

Constant velocity universal joints have heretofore been used with independent wheel suspension systems to avoid the debilitating effects of the foregoing cyclic speed variations of Cardan-type joints while permitting substantially greater articulation angles of the wheel with respect to the drive shaft or the drive shaft with respect to the differential of the power delivery unit. Constant velocity universal joints of the type that provide uniform velocity between the driving and driven members at any intersecting angle of the joint are shown in U.S. Pat. Nos. 2,046,584 to Rzeppa, 3,162,026 to Ritsema, and also commonly assigned U.S. Pat. Nos. 3,688,521, 3,928,985, 4,240,680 and 4,231,233, the specifications of which are hereby incorporated by reference. Such known constant velocity universal joints have heretofore been used to carry the driving torque transmitted through the spherical ball members of the joint. These balls ride in sets of opposing axial grooves formed on a partially-spherical inner joint member and on a partially-spherical outer joint member. Ball guide means, in the form of a cage, are positioned to capture and guide the balls through a homokinetic plane or rotation wherein the centers of the balls very nearly bisect the articulation angle between the driving and driven shafts resulting in a constant velocity transmission of rotary motion. The ball cage normally consists of upper and lower partially-spherical surfaces guided, respectively, on the partially-spherical inner and outer surfaces of the joint members, but are designed to have radial clearances therebetween in order to insure lubrication of the surfaces and thereby avoid excessive heat build up.

As explained more fully in the aforesaid U.S. Pat. No. 3,928,985, issued Dec. 30, 1975, when the connecting drive shafts transmit torque loads at an articulated angle, internally generated joint friction and joint geometry of such constant velocity universal joints cause the inner and outer joint members to shift with respect to each other to take up the aforementioned clearances. Balls in diametrically opposite sets of grooves are thrust in opposite directions, causing the cage to be somewhat tilted or skewed relative to the design. The forward and aft end portions of the upper and lower partially-spherical surfaces of the cage are tilted or skewed under torque transmitting loads and bear radially against the inner and outer spherical joint members. Such skewed contact between the inner and outer spherical surfaces of the cage with the respective inner and outer joint members is tolerated to avoid the undesirable friction effects of greater surface contacts with smaller clearances. The internally generated loads, as a result of torque transmission through the joint, have been observed to decrease from about a maximum of three hundred pounds per wheel, which occurs when maximum torque is transmitted at extreme articulation angles of the drive joints just before a vehicle begins to move.

In any event, the balls and axial grooves of the constant velocity universal joint have heretofore been used to translate the driving torque while the spherical portions of the inner and outer joint members experience the internally generated loads, such internally generated loads being carried either by direct contact between the inner and outer joint members or through the interposed spherical surfaces of the cage. As taught in U.S. Pat. No. 3,789,626, to Girguis, where one constant velocity universal joint was used as a fixed joint, as in the drive shaft of a rear drive motor vehicle, an object of such an application is to maintain the joint elements free of axial internal forces, even though the joint was constructed to absorb forces, at least those related to torque translation. In fact, the joint was designed to avoid transmitting axial forces through the control element. Therefore, when used at opposite ends of a driving half-shaft, one of such constant velocity universal joints has heretofore been of the axial slip or plunging variety, allowing movement of the driven joint with respect to the driving joint, and the constant velocity universal joint at the other end has been of the non-axial slip or fixed type not permitting such axial movement.

Vehicle differentials have heretofore been mounted to the vehicle frame so that a differential input axis is not necessarily coaxial relative to the output axis of the engine and is subject to movement therebetween during normal vehicle operation. To accommodate this non-coaxial alignment and movement, the engine output is normally coupled to the differential input through a pair of universal joints coupled by a prop shaft. One universal joint couples the driving torque from the engine output to the prop shaft through an engine-to-prop shaft articulation angle therebetween, while the other universal coupling couples the driving torque from the output end of the prop shaft to the differential input through a prop shaft-to-differential articulation therebetween. Each such universal joint increases the weight of the vehicle by both the weight of the joint and the additional structure required at either the engine or the differential for mounting the joint. Moreover, each such universal joint represents a separate concern during assembly of the vehicle and subsequent maintenance thereof.

It is also known that, to obtain proper steering characteristics, the camber of the wheel, or the angle that a longitudinal plane therethrough makes with the axis, as viewed from the front or rear of the vehicle, must be maintained within predetermined limits in order to afford the desired handling and steering characteristics. However, as the independent wheel suspension causes the wheel to move about a swing axis having a pivot at the side of the differential, the wheel camber changes by an amount varying with the swinging movement of the wheel. To minimize the resulting change of camber, various structures have heretofore been provided to lengthen the effective swing radius of the wheel. However, such extra structures have been comparatively complex and costly. It is, therefore, desirable to reduce the camber of the wheel by employing existing suspension members.

It is known to use transverse stabilizers to restrain motion of one wheel assembly relative to another. However, such stabilizers have heretofore not been coupled to the vehicle differential.

U.S. Pat. No. 3,625,300, to Barenyi, et al., discloses the suspension of an axle unit of a motor vehicle by a support member permitting pivoting of the wheel pair in relation to the vehicle superstructure about two mutually perpendicular essentially horizontal axes, but without allowing any relative movement about either axis between the wheels and the axle gear housing.

SUMMARY OF THE INVENTION

The present invention recognizes that new and improved concepts for independent wheel suspension systems may be obtained by coupling a vehicle differential to a pivotable stabilizer. The present invention recognizes that the engine and transmission vibrations may be dampened by the use of a resiliently mounted stabilizer assembly. The present invention further recognizes that by allowing the differential to pivot about the stabilizer assembly axis, the engine output may be coupled to the differential input by only one universal coupling, thereby saving the expense and maintenance of a second coupling.

In accordance with the present invention, a stabilizer assembly is coupled between the longitudinal frame members of the vehicle so as to be rotatable about a transverse pivot axis. The stabilizer assembly includes a stabilizer rod, the end portions of which are journalled in resilient bearings mounted on the frame members so as to resist longitudinal bending of the stabilizer rod. Each wheel assembly is coupled to the stabilizer rod by a trailing arm attached to the stabilizer rod by a splined connection resisting twisting movement of the trailing arms. Interposed between the trailing arms about the stabilizer rod is a resilient stabilizer tube of longitudinal stiffness cooperating with the longitudinal stiffness of the stabilizer rod to prevent end for end bending thereof. The outboard ends of the resilient stabilizer tube are secured to an enlarged diameter portion of the stabilizer rod by bushings including an inner metal sleeve surrounded by resilient material. Between its two ends, the stabilizer tube is spaced from the stabilizer rod by resilient material dampening vibrations imparted to either the stabilizer rod or the stabilizer tube. The stabilizer tube has a central portion attached, by a differential mounting plate, to the vehicle differential having a differential output axis substantially parallel to the transverse pivot axis. The differential has an input about an input axis that is coupled to the engine output of an internal combustion engine by a prop shaft. The differential end of the prop shaft is coupled to the differential input so that the prop shaft axis is coaxial with the differential input axis. The engine end of the prop shaft is coupled to the engine output by a constant velocity universal joint of the axially plunging type. Articulation between the prop shaft and the engine output is accommodated by movement of the differential about the transverse pivot axis and the differential output axis.

It is, therefore, a primary object of the present invention to provide a new and improved independent wheel suspension system.

It is a further object of the present invention to provide a new and improved independent wheel suspension system wherein stabilizer means pivotable about a transverse axis are coupled to both a wheel assembly and also the vehicle differential.

It is a further primary object of the present invention to provide an independent wheel suspension system having a differential pivotable about more than one axis.

It is a further object of the present invention to provide an independent wheel suspension system of the foregoing type, wherein the stabilizer means include a stabilizer rod and a resilient stabilizer tube, the outboard ends of the rod being journalled in respective longitudinal frame members and the resilient stabilizer tube being connected to the vehicle differential.

It is a further object of the present invention to provide an independent wheel suspension system of the foregoing type, wherein the outboard ends of the stabilizer tube are journalled at enlarged diameter portions of the stabilizer rod so that the stabilizer tube in addition to being coupled to the differential also increases the transverse bending stiffness of the suspension system.

It is a further object of the present invention to provide an independent wheel suspension system of the foregoing type, wherein the stabilizer tube is separated from the stabilizer rod by resilient material serving to dampen vibrations and noise communicated to either the tube or the rod.

It is a further object of the present invention to provide an independent wheel suspension system having stabilizer means coupled to both the wheel assembly and the differential wherein the stabilizer means includes a track tube mounted to the differential between extensions of the trailing arms, such track tube affording greater stability against lateral forces while also permitting torsional elasticity to allow movement of one of the trailing arms relative to the other.

It is a further object of the present invention to provide an independent wheel suspension system of the foregoing type, wherein the coupling of the differential to the stabilizer means to pivot therewith about the transverse pivot axis allows the output of the engine to be coupled to the differential using just one universal joint.

It is a further object of the present invention to provide an independent wheel suspension system of the foregoing type, wherein the universal joint coupling the engine to the prop shaft is of the axially plunging constant velocity type.

These and other features and objects of the present invention will become more apparent to those skilled in the art when the following detailed description of the preferred embodiment of the invention and the appended claims are taken in conjunction with the appended drawings.

DETAILED DESCRIPTION OF THE PREFERRED EMBODIMENT

Figure 1:
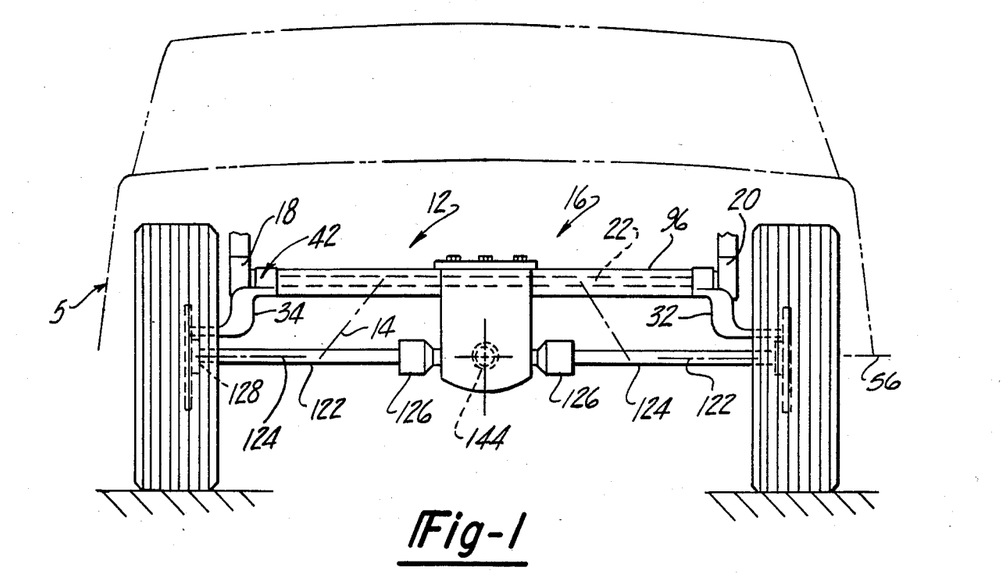
FIG. 1 is a schematic view of the independent wheel suspension system wherein the wheel assemblies and differential are both coupled to the stabilizer means in accordance with the present invention.
Figure 2:
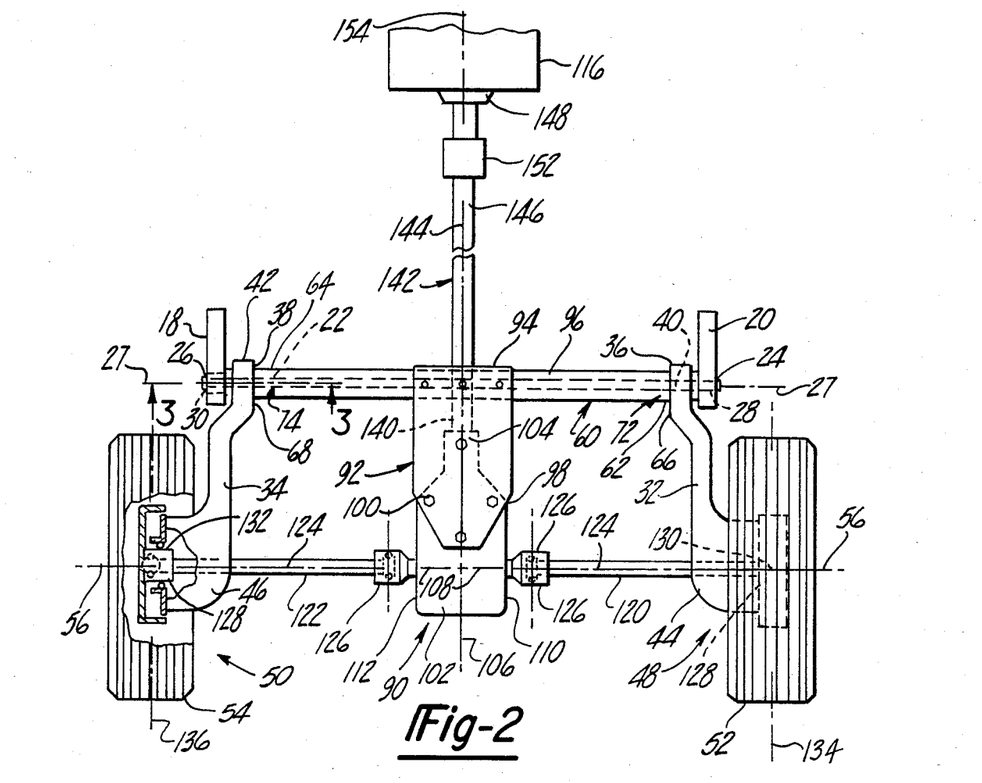
FIG. 2 is a plan view of the independent wheel suspension system provided in accordance with the present invention.

With reference now to FIGS. 1 and 2, there is shown a rear view of a four-wheeled motor vehicle which includes a body 5 mounted to a chassis 12. The chassis 12 is supported in a known manner, such as by shock absorbers 14, from a vehicle support means in the form of a vehicle frame 16 that includes a pair of spaced-apart longitudinal side frame members 18 and 20. Chassis and/or chassis support means, as used herein, are intended to include a vehicle made of unitary construction wherein some of the chassis components are provided in the body of the vehicle.

Secured between the side frame members 18 and 20 are stabilizer means in the form of a metal stabilizer rod 22 and frame journal means 24 and 26, described in further detail below, rotatably coupling the outboard rod end portions 28 and 30 of the stabilizer rod 22 respectively to the side frame members 18 and 20 about a transverse stabilizer axis 27. A pair of trailing arms 32 and 34, each having a hub-shaped end portion 36 and 38 fixed to a respective rod portion or arm hub-end 40 and 42, rotate therewith about the transverse stabilizer pivot axis 27. Each of the trailing arms 32 and 34 also have a respective wheel end portion 44 and 46 suitably coupled in a known manner to a pair of laterally disposed wheel assemblies 48 and 50, each having a respective wheel 52 and 54, adapted to rotate about a wheel axis 56.

The stabilizer means further includes a non-metallic stabilizer tube 60 having a pair of tube end portions 62 and 64 interposed between, and adapted to bear against, respective inward faces 66 and 68 of the hub-shaped end portions 36 and 38 of the trailing arms 32 and 34. The stabilizer tube 60 is mounted resiliently to the stabilizer rod 22 by a pair of tube journal means 72 and 74, described in further detail below. In the alternative embodiment shown in FIG. 5, the stabilizer means also includes a track tube 80 pivotably interposed by pivot pins 82 and 84 between a pair of rearward portions 86 and 88 of the respective trailing arms 32 and 34.

Figure 5:
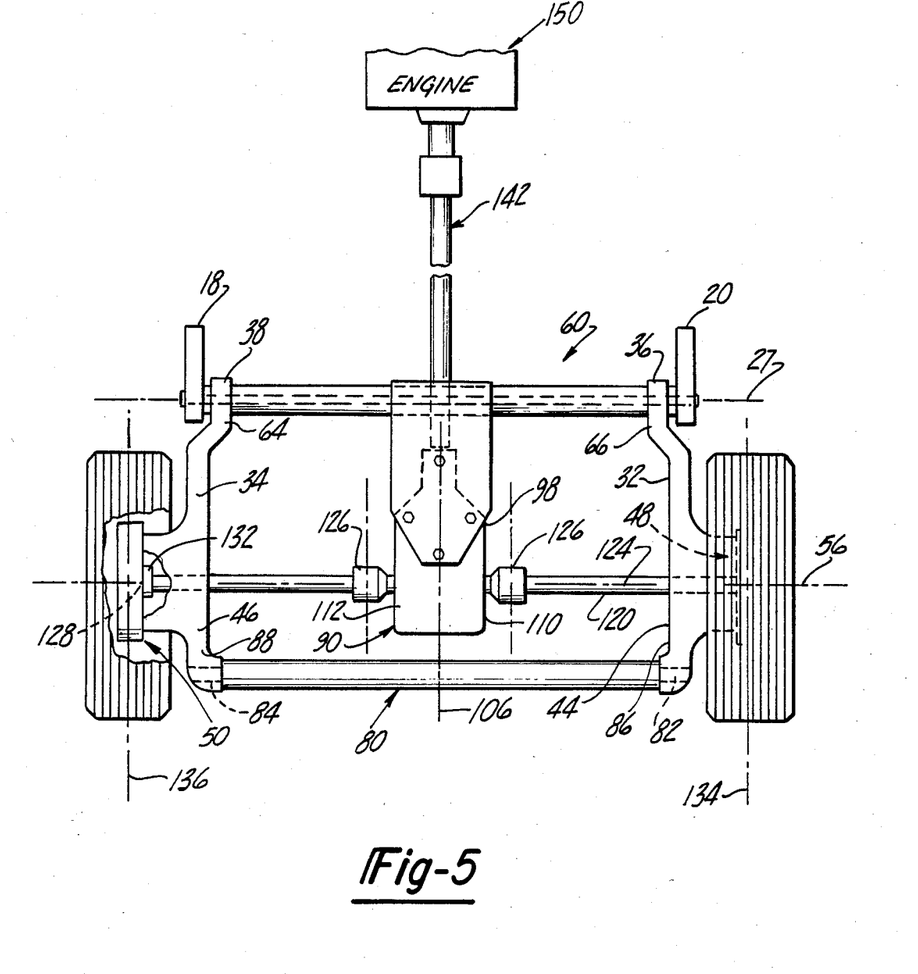
FIG. 5 is a plan view of an alternative embodiment of the present invention wherein the stabilizer means include forward and rearward stabilizer members mounted forwardly and rearwardly of the differential between the trailing arms.

The stabilizer means function through the stabilizer rod 22 and the trailing arms 32 and 34 to restrain relative angular movement between the wheel assembly 48 and the wheel assembly 50 about the transverse stabilizer pivot axis 27 while the stabilizer tube 60 provides additional bending stiffness to that of the stabilizer rod 22, and to that of the track tube 80 in the case of the FIG. 5 embodiment, to prevent relative bending movement along the transverse stabilizer pivot axis 27 between the side frame members 18 and 20 and also between the trailing arms 32 and 34.

As best seen in the plan view of FIG. 2, the stabilizer means are also coupled to a differential 90 by a differential mounting plate 92 having a forward end portion 94 suitably secured to a flat upper surface 96 of the stabilizer tube by suitable means and having a rearward portion 98 secured by studs 100 to an upper surface 102 of the differential 90. The differential 90 also has an input end 104 adapted to receive a driving torque about a differential input axis 106 and the differential is adapted to redirect this driving torque by a drive pinion and side bevel gears (not shown) about an output axis 108 through the two spaced-apart lateral sides 110 and 112 of the differential. A pair of drive shafts 120 and 122, each having a drive axis 124, are adapted to couple the driving torque to the respective wheel assemblies 48 and 50 through a respective pair of inboard and outboard constant velocity universal joints 126 and 128, the outboard universal joints having a respective articulation axis 130 and 132 in a respective center plane 134 and 136 through the middle of each wheel 52 and 54.

Figure 6:
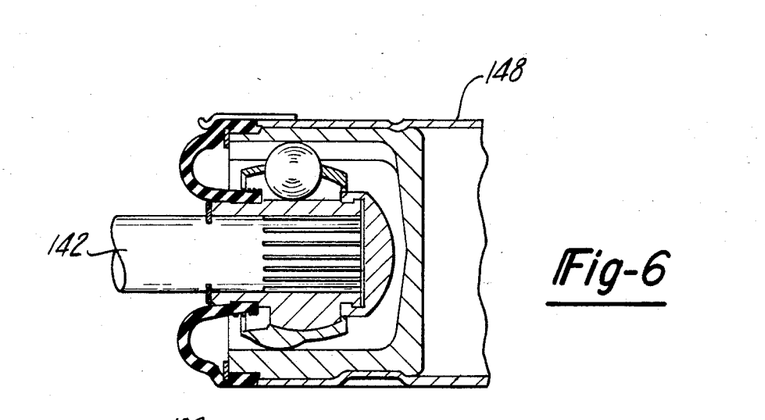
FIG. 6 is a view, partially in cross-section and partially broken away, of an axially plunging type of constant velocity universal joint used to couple the engine and the prop shaft in accordance with the present invention.

The differential input end 104 is fixedly connected in a known manner to a prop shaft differential end 140 of a prop shaft 142 having a prop shaft axis 144 coaxial with the differential input axis 106. The prop shaft 142 also has an engine end 146 coupled to an engine output 148 of an engine 150 by a constant velocity universal joint 152 of the axially plunging type shown in FIG. 6 and described in greater detail in U.S. Pat. No. 3,688,521, to Smith, et al., issued Sept. 5, 1972, the specification of which is hereby incorporated by reference. Articulation between the prop shaft axis 144 and an engine output axis 154 of the engine 150 is accommodated at the differential 90 by a commensurate angular movement about the transverse stabilizer pivot axis 27 between the differential 90 and the side frame members 18 and 20.

The non-metallic nature of the stabilizer tube 60, and the track tube 80 in the case of the FIG. 5 embodiment, suppresses noise and vibrations transmitted thereto from the wheel assemblies 48 and 50 as transmitted through the respective trailing arms 32 and 34; from the engine 150 as transmitted through the universal joint 152, the prop shaft 142, the differential 90, and the differential mounting plate 92; and from other parts of the vehicle as transmitted through the side frame members 18 and 20 and the stabilizer rod 22. To further isolate and suppress such noise and vibrations, the frame journal means 24 and 26 supporting the end portions 28 and 30 of the stabilizer rod 22 and also the tube journal means 72 and 74 supporting the stabilizer tube 60 relative to the stabilizer rod 22 are preferably of the design shown in greater detail in FIG. 3. As there seen, each of the frame journal means 24 and 26 includes an annular journal cup 160 fitted over the end of the stabilizer rod 22 and having an internal bore 162 in sliding engagement with the outboard rod end portion 28. The outer cylindrical periphery 164 of each journal cup 160 is suitably secured, such as by bonding, to a resilient annular bushing 166. The outer periphery includes a cylindrical bushing sleeve 168 captured radially on each side frame member 18 and 20 by a bushing cap 170 fastened thereto by known means. To restrain axial movement along the transverse stabilizer pivot axis 27 between the outboard rod end 28 and the resilient annular bushing 166, the journal cup 160 has a cup flange 172 at its inboard surface.

Figures 3, 4:
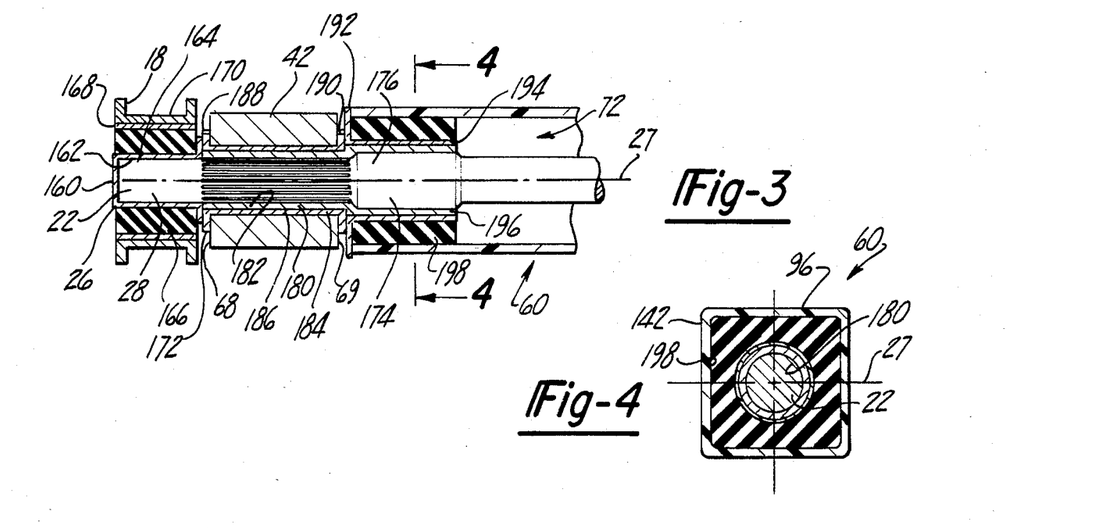
FIG. 3 is a view, partially in cross-section and partially broken away, of one embodiment of the stabilizer means of the present invention and the mounting thereof to the vehicle frame and the trailing arms, as viewed along line 3—3 of FIG. 2.
FIG. 4 is a cross-section through the stabilizer means of the present invention taken along line 4—4 of FIG. 3.

The stabilizer rod 22 consists of an enlarged diameter axial length section 174 spaced from the outboard rod end portion 28 by a necked-down axial length shoulder portion 176. The axial length section 174 and the axial length shoulder portion 176 of the stabilizer rod 22 are enclosed by a contoured metal sleeve 180 for journalling the arm hub end 42 of the trailing arm 34, the arm hub end 42 having a bore 182 fitted with a spool-shaped bushing 184. The spool-shaped bushing 184 has a central portion 186 journalled on the sleeve 180 and is bounded by oppositely disposed annular spool side flanges 188 and 190 capturing the sides 68 and 69 of the arm hub end 42 of the trailing arm 34. The spool side flange 188 is adapted to bear against the cup flange 172 and the inboard spool side flange 190 is adapted to bear against the tube journal means 72. The tube journal means 72 includes an annular tube sleeve flange 192 of a tube journal sleeve 194 having an axial journal length 196 along the enlarged diameter axial length section 174 of the stabilizer rod 22 for providing a journal bearing with the sleeve 180. Spaced intermediate the axial journal length 196 of the journal sleeve 194 and the inner surface of the stabilizer tube 60 is a resilient bushing 198 centering the stabilizer tube 60 to be coaxial about the transverse stabilizer pivot axis 27 while also dampening vibrations and noise communicated to the stabilizer tube 60 while permitting the stabilizer tube 60 to pivot about the transverse pivot axis 27.

Those skilled in the art will recognize that the vehicle suspension system described herein may also include various combinations of helical springs, leaf springs, shock absorbers and other well known dampening suspension devices.

Although the best mode contemplated by the inventor for carrying out the present invention as of the filing date hereof has been shown and described herein, it will be apparent to those skilled in the art that suitable modifications, variations and equivalents may be made without departing from the scope of the invention, such scope being limited solely by the terms of the appended claims.

What is claimed is:

1. An independent wheel suspension system for a vehicle having a chassis, vehicle support means comprising a first and a second frame member for supporting said chassis for displacement relative to a driving surface, a pair of laterally disposed wheel assemblies each having a wheel rotatable about a wheel axis, an engine adapted to provide driving torque about an engine output axis at an engine output, differential means having a differential input axis at a differential input and a differential output on opposite sides of said differential input axis, and a pair of universally coupled drive shaft means respectively coupling one said wheel and one said differential output, said independent wheel suspension system comprising:

stabilizer means coupled to said first and second frame members so as to be rotatable about a transverse pivot axis, said stabilizer means being coupled to each of said wheel assemblies and said differential means so as to permit movement about said transverse pivot axis between said wheel assemblies and said differential means relative to said vehicle support means; and a prop shaft with a prop shaft axis, an engine end universally coupled to said engine output, and a differential end connected to said differential input so that said prop shaft axis is coaxial with said differential input axis;

whereby articulation of said prop shaft axis relative to said engine output axis is accommodated by movement of said differential means about said transverse pivot axis.

2. The independent wheel suspension system of claim 1, wherein said stabilizer means comprises a stabilizer rod and a pair of resilient bushing means to pivotably couple a pair of outboard end portions of said stabilizer rod respectively to said first and second frame members.

3. The independent wheel suspension system of claim 2, wherein a pair of arms respectively couple said wheel assemblies and said stabilizer rod, whereby said stabilizer rod and said arms cooperate to permit both said wheels to move in the same direction about said transverse pivot axis while also resisting motion of one wheel relative to the other thereabout.

4. The independent wheel suspension system of claim 2, wherein said stabilizer means further comprises differential mounting means extending along a portion of said stabilizer rod and resiliently spaced therefrom by resilient spacing means and differential attaching means connecting said differential means and said differential mounting means, whereby said resilient spacing means and said resilient bushing means cooperate to dampen wheel vibrations and differential vibrations.

5. The independent wheel suspension system of claim 4, wherein said differential mounting means comprises a substantially hollow structure encircling said stabilizer rod and having an outer surface fixed to said differential attaching means.

6. An independent wheel suspension system for a vehicle having a chassis, vehicle support means comprising a first and a second frame member for supporting said chassis for displacement relative to a driving surface, a pair of laterally disposed wheel assemblies each having a wheel rotatable about a wheel axis, an engine adapted to provide driving torque about an engine output axis at an engine output, differential means having a differential input axis at a differential input and a differential output on opposite sides of said differential input axis, and a pair of universally coupled drive shaft means respectively coupling one said wheel and one said differential output, said independent wheel suspension system comprising:

stabilizer means coupled to said first and second frame members so as to be rotatable about a transverse pivot axis, said stabilizer means comprising a stabilizer rod, a pair of resilient bushing means to pivotably couple a pair of outboard end portions of said stabilizer rod respectively to said first and second frame members, and a pair of spaced-apart enlarged diameter portions with a shoulder therebetween, one of said enlarged diameter portions being journalled in one of said first and second frame members, the other of said enlarged diameter portions being spaced from said differential means by an inner bearing sleeve and an outer resilient bushing, said stabilizer means further being coupled to each of said wheel assemblies and said differential means so as to permit movement about said transverse pivot axis between said wheel assemblies and said differential means relative to said vehicle support means; and a prop shaft with a prop shaft axis, an engine end universally coupled to said engine output, and a differential end connected to said differential input so that said prop shaft axis is coaxial with said differential input axis;

whereby articulation of said prop shaft axis relative to said engine output axis is accommodated by movement of said differential means about said transverse pivot axis.

7. An independent wheel suspension system for a vehicle having a chassis, vehicle support means comprising a first and a second frame member for supporting said chassis for displacement relative to a driving surface, a pair of laterally disposed wheel assemblies each having a wheel rotatable about a wheel axis, an engine adapted to provide driving torque about an engine output axis at an engine output, differential means having a differential input axis at a differential input and a differential output on opposite sides of said differential input axis, and a pair of universally coupled drive shaft means respectively coupling one said wheel and one said differential output, said independent wheel suspension system comprising:

stabilizer means comprising a forward and a rearward transverse tube means and being rotatable about a transverse pivot axis, said forward transverse tube means being pivotally supported by said first and second frame members;

first and second arm means coupling said respective wheel assemblies and said stabilizer means to permit movement about said transverse pivot axis between said wheel assemblies and said differential means relative to said vehicle support means, each of said first and second arm means comprising first and second arm portions extending in opposite directions from said wheel axis, said first arm portion extending forwardly from said wheel axis and said second arm portion extending rearwardly thereof, said forward transverse tube means being pivotally supported by said first and second frame members intermediate said first and second arm means; and     a prop shaft with a prop shaft axis, an engine end universally coupled to said engine output, and a differential end connected to said differential input so that said prop shaft axis is coaxial with said differential input axis;

whereby articulation of said prop shaft axis relative to said engine output axis is accommodated by movement of said differential means about said transverse pivot axis.

8. The independent wheel suspension system of claim 6, and further comprising a second stabilizer rod, each of said stabilizer rod and said second stabilizer rod extending transversely of said chassis, and wherein said differential means are attached to one of said stabilizer rod and said second stabilizer rod by differential attaching means.

9. The independent wheel suspension system of claim 7, wherein said first and second arm portions of said stabilizer means cooperate to provide stability against lateral forces and comprise torsionally elastic material to compensate for relative motion of one of said first and second arm means relative to the other.

10. An independent wheel suspension system for a wheel assembly of a vehicle having a vehicle support vehicle means for supporting said chassis for displacement relative to a driving surface comprising:

transverse support means rotatably supported by said vehicle support means so as to allow an angular movement relative thereto about a first transverse axis;

power delivery means having an output axis coupled to said wheel assembly; and     coupling means rotatably coupling said transverse support means and said power delivery means so as to permit movement thereof about a second axis independent of said first transverse axis.

11. The independent wheel suspension system of claim 10, wherein said second axis is one axis of said differential output axis, a second differential axis substantially parallel to said differential output axis, and a swing axis substantially perpendicular to said differential output axis.

12. An independent wheel suspension system for a vehicle having a power delivery unit for translating torque from an engine through a differential to a vehicle driving wheel in contact with a driving surface, said independent wheel suspension system comprising:

transverse support means mounted to said vehicle so as to permit movement of said transverse support means relative to said vehicle, said transverse support means having a first axis of rotation;

a second axis of rotation spaced in a predetermined position relative to said first axis of rotation for cooperation therewith;

means for mounting said differential to said transverse support means and about said second axis of rotation such that said differential pivots about said first axis of rotation and said second axis of rotation when said vehicle is displaced relative to said driving surface.

\* \* \* \* \*

UNITED STATES PATENT AND TRADEMARK OFFICE
CERTIFICATE OF CORRECTION

PATENT NO. : 4,600,072
DATED : July 15, 1986
INVENTOR(S) : Werner Krude

It is certified that error appears in the above-identified patent and that said Letters Patent is hereby corrected as shown below:

Column 2, line 18, delete "connect" and insert ---- connected ----.

In the Claims

Column 12, line 5, before "vehicle support" insert ---- chassis, and ----.

Column 12, line 6, delete "vehicle".

In the Abstract

Line 7, delete "wherby" and insert ---- whereby ----.

Signed and Sealed this

Twenty-seventh Day of January, 1987

Attest:

DONALD J. QUIGG

Attesting Officer

Commissioner of Patents and Trademarks